United States Patent [19]

Cramer

[11] Patent Number: 5,766,310
[45] Date of Patent: Jun. 16, 1998

[54] SINGLE STAGE SECONDARY HIGH PURITY OXYGEN CONCENTRATOR

[75] Inventor: Robert Louis Cramer, Davenport, Iowa

[73] Assignee: Litton Systems Incorporated, Woodland Hills, Calif.

[21] Appl. No.: 684,950

[22] Filed: Jul. 19, 1996

[51] Int. Cl.[6] .................................. B01D 53/047
[52] U.S. Cl. .................. 95/96; 95/11; 95/21; 95/138; 96/111; 96/115; 96/130; 96/143
[58] Field of Search .................. 95/11, 21, 130, 95/138, 96–105; 96/111, 113–115, 121, 130–133, 143

[56] References Cited

U.S. PATENT DOCUMENTS

| | | | |
|---|---|---|---|
| 3,923,477 | 12/1975 | Armond et al. | 95/130 X |
| 4,190,424 | 2/1980 | Armond et al. | 95/130 X |
| 4,302,224 | 11/1981 | McCombs et al. | 55/160 |
| 4,331,455 | 5/1982 | Sato | 95/21 |
| 4,342,573 | 8/1982 | McCombs et al. | 55/161 |
| 4,386,945 | 6/1983 | Gardner | 95/130 X |
| 4,448,592 | 5/1984 | Linde | 95/130 |
| 4,566,881 | 1/1986 | Richter et al. | 95/138 X |
| 4,576,616 | 3/1986 | Mottram et al. | 95/130 X |
| 4,586,634 | 5/1986 | Minter et al. | 222/3 |
| 4,661,125 | 4/1987 | Haruna | 55/26 |
| 4,744,803 | 5/1988 | Knaebel | 95/130 X |
| 4,813,979 | 3/1989 | Miller et al. | 96/115 X |
| 4,869,733 | 9/1989 | Stanford | 95/138 X |
| 4,880,443 | 11/1989 | Miller et al. | 55/26 |
| 4,959,083 | 9/1990 | Garrett | 95/130 X |
| 4,973,339 | 11/1990 | Bansal | 96/115 X |
| 4,985,052 | 1/1991 | Haruna et al. | 95/138 X |
| 5,137,549 | 8/1992 | Stanford et al. | 95/130 X |
| 5,154,737 | 10/1992 | Jenkins et al. | 95/11 |
| 5,340,381 | 8/1994 | Vorih | 95/21 |
| 5,354,361 | 10/1994 | Coffield | 95/103 |
| 5,395,427 | 3/1995 | Kumar et al. | 95/130 X |
| 5,447,557 | 9/1995 | Golden et al. | 95/138 X |

FOREIGN PATENT DOCUMENTS

| | | |
|---|---|---|
| 0163242 A1 | 12/1985 | European Pat. Off. . |
| 4033140 C2 | 10/1990 | Germany . |

*Primary Examiner*—Robert Spitzer
*Attorney, Agent, or Firm*—Lowe, Price, LeBlanc & Becker

[57] ABSTRACT

A single stage secondary oxygen concentrator for receiving a gas mixture from a first stage oxygen concentrator and a method of use therefor is disclosed. The concentrator includes a first carbon molecular sieve bed and a second carbon molecular sieve bed. A first inlet valve is connected to an inlet of the first carbon molecular sieve bed and a second inlet valve is connected to the inlet of the second carbon molecular sieve bed. A first product outlet valve is connected to the outlet of the first carbon molecular sieve bed and a second product outlet valve is connected to the product outlet of the carbon molecular sieve bed. The oxygen concentrator has control means for controlling a first cycle in which the first carbon molecular sieve bed is being charged with the gas mixture and the second carbon molecular sieve bed is being desorbed. During the first cycle, the first inlet valve is in the open position, allowing the gas mixture to flow into the carbon molecular sieve bed and the first product outlet valve is in the closed position as the gas mixture flows through first carbon molecular sieve bed and oxygen is selectively adsorbed from the gas mixture. The second inlet valve is in the closed position and the second product outlet valve is open allowing a first high purity oxygen product to flow from the second carbon molecular sieve bed.

22 Claims, 2 Drawing Sheets

SINGLE STAGE SECONDARY HIGH PURITY OXYGEN CONCENTRATOR

FIELD OF THE INVENTION

The present invention relates to high purity oxygen concentrators in general and more specifically to a technique and structure for producing oxygen concentrations of very high purity from a gas mixture input supplied by a zeolite molecular sieve first stage. This technique and structure is based on the well-known prior art pressure swing adsorption method, which is in use in many operational systems, but the present invention provides a modification to this technique which will extend and improve overall system performance for more efficient recovery of high purity oxygen from a raw air supply.

BACKGROUND OF THE INVENTION

Most modern concentrators operate on the principle of pressure swing adsorption, which uses cycled pressure shifts across adsorbent beds to increase or decrease the content of a particular constituent gas in a gas mixture. The cycling of the pressure in the beds allows for more efficient concentrator operation, and multiplebed systems are in use which further increase concentrator efficiencies while increasing the available desired gas follow-through.

The main constituent gases of raw air are oxygen, nitrogen and argon. If a concentrator system enhances oxygen purity by removing only nitrogen from raw air, the theoretical limit of attainable oxygen purity is 95% because raw air also contains 1% argon which therefore concentrates to 5%. Just as one type of bed material, zeolite, is effective in removing nitrogen from raw air, so another type, carbon, is effective in removing argon from gaseous mixtures. Prior art teaches that a plurality of stages of pressure swing adsorption beds may be used to remove nitrogen and argon in a tandem manner. If nitrogen and argon both are removed from raw air, essentially all that remains is pure oxygen at 99+% purity. Many applications require high oxygen purity, in which an oxygen purity of 95% is not adequate and a secondary high purity oxygen concentrator is required.

In prior art U.S. Pat. No. 4,661,125 Haruna et al. explains a use of tandem adsorbent beds to enhance the purity of recovered oxygen. Haruna et al. teaches a system that can recover oxygen of 99+% purity from raw air using a system containing zeolite and carbon as adsorber bed materials, but extensive subsystem functions require a complex system for implementation of the oxygen concentrator. For example, the teachings of this patent require that the concentrator system contain two secondary stages, five beds, twenty-five dynamically timed valves, three pumps and five plenums.

Another prior art system is described by Miller et al in U.S. Pat. No. 4,880,443. Miller et al describe a system which involves a device comprised of four interdependent adsorption beds, two of which contain zeolite molecular sieves and two of which contain carbon molecular sieves. Each of the zeolite beds is connected in series with a carbon molecular sieve bed, with the result that the gas flow passes sequentially from a zeolite bed to a carbon bed, and oxygen purities in excess of 99% are reported. The disadvantage of this system is that the carbon molecular sieve is used to adsorb argon, whereas a carbon molecular sieve has a much higher affinity for adsorption of oxygen rather than argon under all but very limited dynamic conditions. This means that low recovery oxygen concentrator characteristics are inherent in the teachings of Miller et al, whereas a preferred method of concentrating oxygen from raw air would provide high oxygen recovery characteristics. The approach of Miller et al. has both stages combined in a single bed, and therefore does not have flexibility to adapt to existing first stages, nor could the approach taught by Miller et al. utilize the 95% product for any other purpose.

Prior art systems are often restricted with respect to applications flexibility, such as being compatible with virtually any zeolite first stage to more easily interface with existing equipments and systems and thus achieve economic, logistic and reliability advantages. Many prior systems containing secondary oxygen concentrators also inefficiently utilize the 95% product supplied, whereas a preferred method of secondary oxygen concentration would utilize virtually all the 95% oxygen product supplied. Prior art systems are often incompatible with typical pump up and storage systems, whereas a preferred method would allow adaptation to virtually any typical pump up and storage system in addition to the desired advantages mentioned above.

There is thus an unmet need in the art to be able to define a secondary oxygen concentrator apparatus which simultaneously provides the desired operational characteristics of simplicity, high recovery characteristics, design flexibility, compatibility with virtually any zeolite first stage, and compatibility with virtually any pump up and storage system. Therefore, it will be advantageous in the art to be able to receive and understand such an invention because usage of the invention would provide significant cost, energy, reliability, and size advantages.

SUMMARY OF THE INVENTION

It is an object of the present invention to provide a method and structure for providing high purity oxygen having minimal complexity, cost, size, and energy requirements while having maximum reliability.

It is further an object of the present invention to provide a method and structure for adsorbing oxygen rather than argon to provide a higher oxygen recovery than can be obtained using the method and structures of the prior art.

It is yet another object of the present invention to provide an oxygen concentrator structure capable of easily interfacing with existing concentrator method and structures.

Therefore, according to the present invention, a single stage secondary high purity oxygen concentrator and method of concentrating oxygen are described. The concentrator has at least a first and a second inlet valve, a first and a second molecular sieve bed, and a first and a second outlet valve. According to a first embodiment of the present invention, the concentrator further comprises a relief valve. During a charge cycle of the first molecular sieve bed, the first inlet valve is open, the first outlet valve is closed, the second inlet valve is closed, and the second outlet valve is open such that adsorbed oxygen from the second molecular sieve bed is desorbed or withdrawn while the first molecular sieve bed is charging. Similarly, during a charge cycle of the second molecular sieve bed, the first input valve is closed, the first outlet valve is open, the second inlet valve is open, and the second outlet valve is closed such that adsorbed oxygen from the -first molecular sieve bed is desorbed or withdrawn while the second molecular sieve bed is charging. After completion of the charge cycle of the first molecular sieve bed, the first outlet valve opens and a surge of gas is vented by the relief valve and after completion of the charge cycle of the second molecular sieve bed, the second outlet valve opens and a surge of gas is vented by the relief valve. According to a second embodiment of the present invention, the concentrator further comprises a pump which during the charge cycle of the first molecular sieve bed withdraws adsorbed oxygen from the first molecular sieve bed and during the charge cycle of the second molecular sieve bed withdraws adsorbed oxygen from the secondmolecular sieve bed.

BRIEF DESCRIPTION OF THE DRAWINGS

The novel- features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawing(s), wherein:

DESCRIPTION OF THE INVENTION

Figure 1:
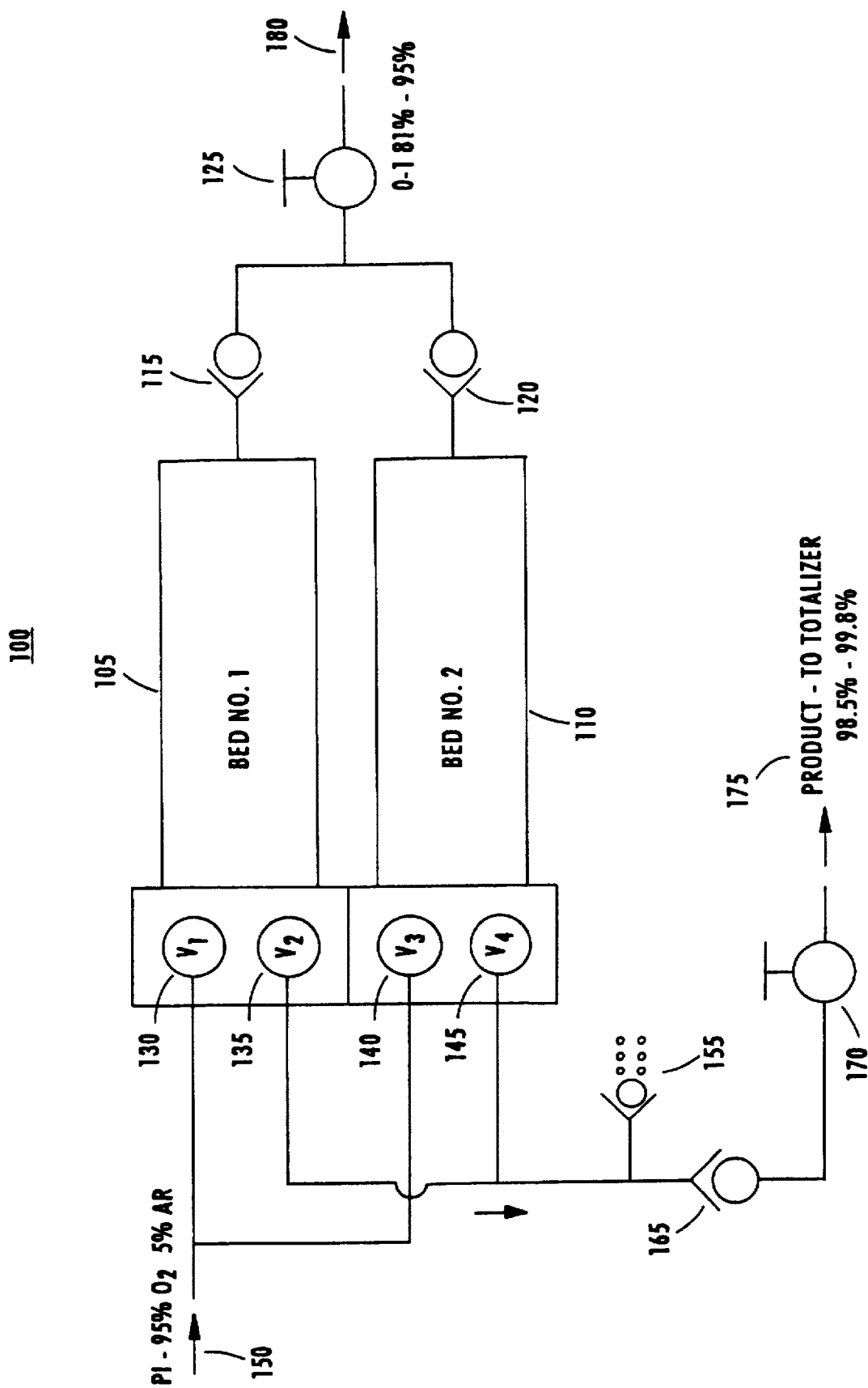
FIG. 1 is a Single Stage Secondary High Purity Oxygen Concentrator, according to a first embodiment of the present invention.

Referring to FIG. 1, Overall Block Diagram 100 depicts a single stage secondary high purity oxygen concentrator. Zeolite Concentrator Output 150 is s supplied to First Carbon Molecular Sieve Bed 105 through First Inlet Valve 130, and Second Carbon Molecular Sieve Bed 110 through Second Inlet Valve 140. First Carbon Molecular Sieve Bed 105 and Second Carbon Molecular Sieve Bed 110 are filled with a carbon molecular sieve and designed for minimum clearance volume, 10% or less, between First Inlet Valve 130 and First Check Valve 115 and between Second Inlet Valve 140 and Second Check Valve 120. No cross flow purge, which is used in most oxygen pressure swing adsorption systems, is used in order to prevent dilution of the oxygen product. When First Inlet Valve 130 is open, First Outlet Valve 135 and Second Inlet Valve 140 are closed and Second Outlet Valve 145 is open. 95% oxygen and 5% argon from Zeolite Concentrator Output 150 enters First Carbon Molecular Sieve Bed 105 through First Inlet Valve 130. As Zeolite Concentrator Output 150 flows through First Carbon Molecular Sieve Bed 105 toward First Check Valve 115, oxygen is selectively adsorbed in the carbon pores by diffusion. Outlet Flow 180 is metered by Adjustable Control Orifice 125.

Valve cycle timing and flow are adjusted so that when the sieve of First Carbon Molecular Sieve Bed 105 is fully charged or nearly saturated with oxygen, and therefore the breakthrough product concentration at Outlet Flow 180 approaches that of Zeolite Concentrator Output 150, First Inlet Valve 130, First Outlet Valve 135, Second Inlet Valve 140, and Second Outlet Valve 145 are switched to their alternate states. At that point all of the interstitial gas is at least 95% pure. When First Outlet Valve 135 opens, the initial surge of gas at high pressure but largely dead volume and interstitial and of lowest purity, is quickly vented through Relief Valve 155. This represents the only truly lost or unusable gas, and typically represents less than 10%. The remainder is then withdrawn at any convenient rate and pressure, and the system operational cycle timed to produce optimum product and venting in preparation for the next cycle. An analogous process is repeated on Second Carbon Molecular Sieve Bed 110. The total system cycle of sequential cycling of First Carbon Molecular Sieve Bed 105 and Second Carbon Molecular Sieve Bed 110 in a repeated manner provides a continuous product supply of oxygen at Product Output 175. Third Check Valve 165 prevents backflow of Product Output 175 and Adjustable Control Orifice 170 allows Product Output 175 to be metered.

Figure 2:
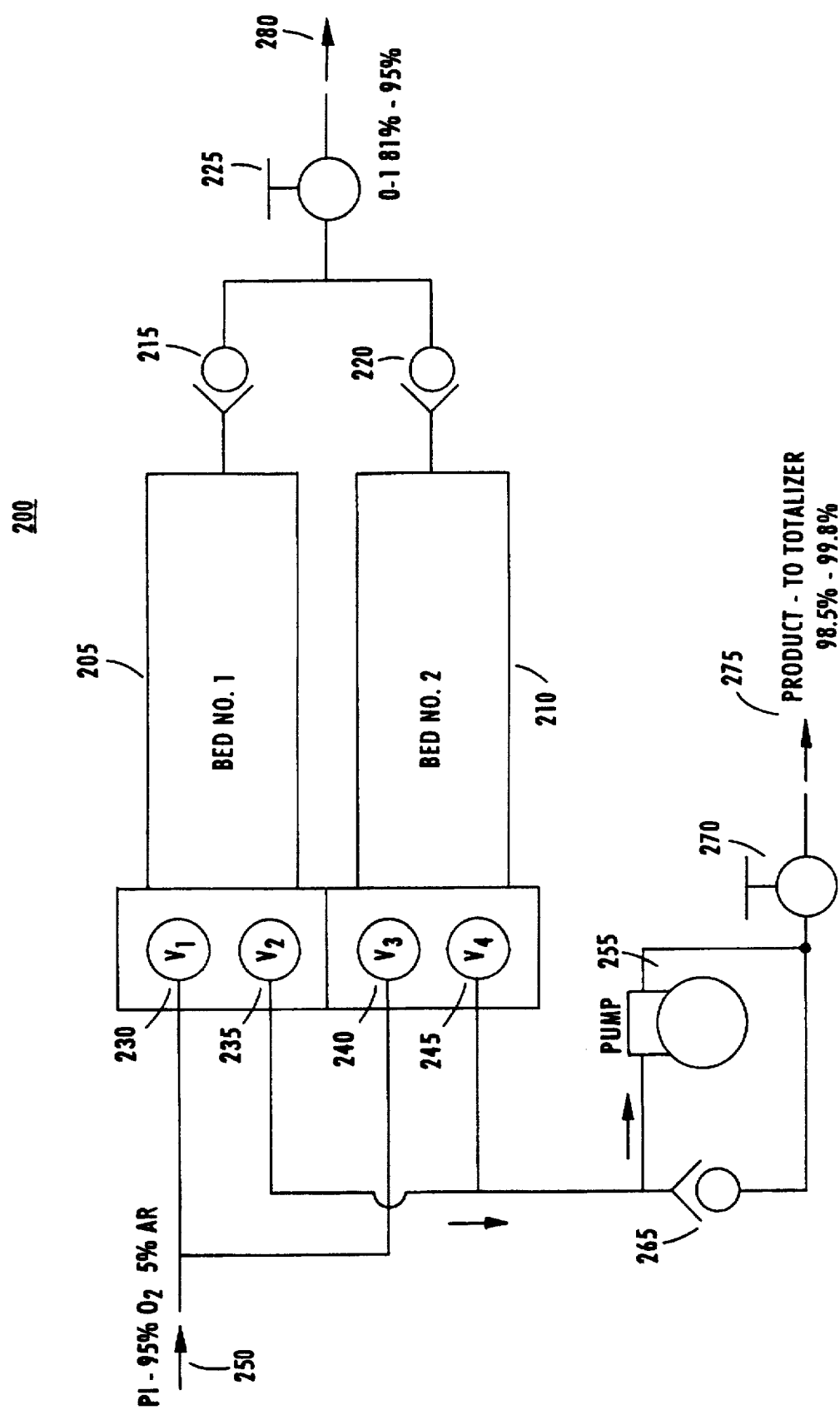
FIG. 2 is a Single Stage Secondary High Purity Oxygen Concentrator with Optional Pump, according to a second embodiment of the present invention.

Referring to FIG. 2, block diagram 200 represents a single stage secondary high purity oxygen concentrator with Optional Pump 255 which serves to produce higher recovery by continuing to withdraw adsorbed oxygen from First Carbon Molecular Sieve Bed 205 and Second Carbon Molecular Sieve Bed 210 while requiring only slightly higher system throughflow to fully charge First Carbon Molecular Sieve Bed 205 and Second Carbon Molecular Sieve Bed 210 during their respective charge cycles. Zeolite Concentrator Output 250 is supplied to First Carbon Molecular Sieve Bed 205 through First Inlet Valve 230, and Second Carbon Molecular Sieve Bed 210 through Second Inlet Valve 240. First Carbon Molecular Sieve Bed 205 and Second Carbon Molecular Sieve Bed 210 are filled with carbon molecular sieve and designed for minimum clearance volume, 10% or less, between First Inlet Valve 230 and First Check Valve 215 and between Second Inlet Valve 240 and Second Check Valve 220. No cross flow purge, which is used in most oxygen pressure swing adsorption systems, is required in order to prevent dilution of the oxygen product. When First Inlet Valve 230 is open, First Outlet Valve 235 and Second Inlet Valve 240 are closed and Second Outlet Valve 245 is open. 95% oxygen and 5% argon from Zeolite Concentrator Output 250 enters First Carbon Molecular Sieve Bed 205 through First Inlet Valve 230. As it flows toward the First Check Valve 215 end of First Carbon Molecular Sieve Bed 205, oxygen is selectively adsorbed in the carbon pores by diffusion. Outlet Flow 280 is metered by Adjustable Control Orifice 225. Valve cycle timing and flow are adjusted so that when the sieve of First Carbon Molecular Sieve Bed 205 is fully charged with oxygen, and therefore the breakthrough product concentration at Outlet Flow 280 approaches that of Zeolite Concentrator Output 250, First Inlet Valve 230, First Outlet Valve 235, Second Inlet Valve 240, and Second Outlet Valve 245 are switched to their alternate states. At that point all of the interstitial gas is at least 95% pure. The oxygen product may then be withdrawn at any convenient rate and pressure, and the system operational cycle timed to produce optimum product and venting characteristics in preparation for the next cycle. An analogous process is repeated on Second Carbon Molecular Sieve Bed 210. The total system cycle of sequential cycling of First Carbon Molecular Sieve Bed 205 and Second Carbon Molecular Sieve Bed 210 in a periodic manner provides a continuous oxygen product supply at Product Output 275. Third Check Valve 265 prevents backflow of Product Output 275 and Adjustable Control Orifice 270 allows Product Output 275 to be metered.

The present invention teaches that the systems of FIG. 1 and FIG. 2 may be implemented using various forms of valve control structures without departing from the spirit of the invention. The simplest form of valve switching occurs on the basis of predetermined time patterns, and would be controlled by a preset electrical timer. The procedure is to initially determine the optimum times by using an oxygen analyzer to measure breakthrough concentration characteristics, and to specify valve switching versus time as deemed optimal under the environmental conditions of interest. Alternatively, a system may include an oxygen analyzer and use its output signal to tailor overall performance by varying valve cycling times as a function of oxygen concentrations in the throughflow gas as environmental ambient conditions change.

Typical results and design criteria of the breadboard system tested will now be described. In the FIG. 1 configuration with 2 inch diameter beds of 0.8 liter each, and a total of 2.4 pounds of Takeda 3A pellets, a supply of 95% oxygen and 5% argon at 50 PSIG with 30 second half-cycles (one minute complete cycle), 5.6 liters of 99+% product is produced each half cycle with the adjustable output orifice set for 4.8 liters per minute of throughflow, and the relief valve venting 3.5 liters total per minute. This is a calculated recovery of $$\frac{5.6 \times 2}{(5.6 \times 2) + 4.8 + 3.5} = 57.4\%$$

With a ⅙ horsepower Thomas wobble plate pump added, the inlet pressure set at 40 PSIG, outlet flow can be set to 4.5 liters per minute and the relief valve removed, 8.3 liters of high purity product is harvested as pressure is drawn down to minus 23 inches of Mercury each half cycle. Thus the calculated recovery is $$\frac{8.3 \times 2}{(8.3 \times 2) + 4.5} = 78.7\%$$

Further tests were run at a simulated altitude of 8000–9000 feet, which would be consistent with operation in a pressurized aircraft environment. In these conditions the recovery without pump improved to approximately 65% from 57.4%.

As can be understood from the foregoing description of the present invention, the common configuration of a two bed pressure swing adsorption molecular sieve system, of the type normally used to concentrate oxygen or nitrogen from air, has been modified in a new way to function as a secondary oxygen purifier. The present invention teaches that this system will increase oxygen concentration from the maximum achievable by Zeolite molecular sieves (95% oxygen, 5% argon) to oxygen purity levels in excess of 99%. The present invention teaches two design options, the oxygen concentrator without pump which yields approximately 57% recovery from the 95% oxygen, 5% argon mixture supplied, and the oxygen concentrator with optional pump included which will result in about 79% recovery. The present invention provides a means for generating high purity oxygen, using the methods and techniques explained above, for oxygen supply in medical, airborne and commercial applications wherein high recovery of air supply, energy, size, weight, simplicity, reliability, simple system integration and initial cost are important considerations.

One unique feature of the present invention is that the adsorbed oxygen is desorbed (withdrawn) and saved, whereas the low flow throughput is enriched in argon. This is the opposite of the method described in U.S. Pat. No. 4,880,443.

The present invention can attain high oxygen purity in a single stage primarily because of the low interstitial gas volume, proper control of flow and cycle timing to assure the highest possible interstitial gas purity which is then mixed with the adsorbed oxygen for high purity during desorption, and the use of a relief valve or similar means to vent the appropriate fraction of the "low"purity interstitial gas at the beginning of each desorption cycle. The high recovery characteristic is obtained by utilizing the most selective carbon molecular sieve, using minimum through flow and timing to obtain oxygen purity, with further recovery improvement obtainable from a denser sieve packing.

The present invention also provides an argon enriched throughflow which is usable for many breathing gas or other applications, because the throughflow gas has an oxygen concentration of approximately 90%. Therefore almost no oxygen from the initial zeolite concentrator input to the secondary oxygen concentrator is lost. In addition, the present invention teaches a design approach which is adaptable to many variations of first stage zeolite pressure swing adsorption supplies and to different bed and valve and sizing combinations. Additionally, virtually any means may be used for product withdrawal, storage and delivery.

While the invention has been particularly shown and described with reference to a preferred embodiment, it will be understood by those skilled in the art that various changes in form and detail may be made therein without departing from the spirit and scope of the invention. For instance, the preferred embodiments of the present invention illustrate two molecular sieve beds that are used to produce a high purity oxygen product. The size as well as the number of beds may be varied to achieve the desired throughput and purity, although the smaller the interstitial and unfilled volume of the bed, the greater the purity of oxygen which will be achieved.

What is claimed is:

1. A method for producing a high purity oxygen concentration from a gas mixture supplied from a zeolite molecular sieve concentrator, comprising the steps of:
   (a) opening a single inlet valve to a first carbon molecular sieve bed;
   (b) closing an outlet valve to the first carbon molecular sieve bed;
   (c) charging the first carbon molecular sieve bed with the gas mixture through the single inlet valve;
   (d) allowing the gas mixture to flow through the first carbon molecular sieve bed and selectively adsorbing oxygen from the gas mixture;
   (e) closing a single inlet valve to a second carbon molecular sieve bed;
   (f) opening an outlet valve to the second carbon molecular sieve bed; and
   (g) desorbing a first high purity oxygen product from the second carbon molecular sieve bed.

2. The method of claim 1, further comprising the steps of:
   (a) closing the single inlet valve to the first carbon molecular sieve bed;
   (b) opening the outlet valve to the first carbon molecular sieve bed;
   (c) charging the second carbon molecular sieve bed with the gas mixture;
   (d) allowing the gas mixture to flow through the second carbon molecular sieve bed and selectively adsorbing oxygen from the gas mixture;
   (e) closing a single inlet valve to the second carbon molecular sieve bed;
   (f) opening an outlet valve to the first carbon molecular sieve bed; and
   (g) desorbing a second high purity oxygen product from the first carbon molecular sieve bed.

3. The method of claim 1, wherein the gas mixture is supplied from a single source.

4. The method of claim 1, wherein steps (a) and (b), (e) and (f) are performed nearly at the same time.

5. The method of claim 1, wherein steps (d) and (g) occur for substantially the same amount of time.

6. The method of claim 1, wherein said desorbing step is accomplished using a pump.

7. The method of claim 1, wherein in the step of selectively adsorbing oxygen from the gas mixture as the gas mixture flows through the first molecular sieve bed, the oxygen is adsorbed in a plurality of pores of the first sieve of the first molecular sieve bed by diffusion.

8. The method of claim 1, wherein the first molecular sieve bed is charged with the gas mixture until an oxygen concentration of a first outlet flow from the first molecular sieve bed is approximately equal to the oxygen concentration of the gas mixture.

9. The method of claim 1, comprising the additional step of:
   metering outlet flow of the first molecular sieve bed and the second molecular sieve bed.

10. The method of claim 9, wherein the step of metering outlet flow is accomplished by a control orifice.

11. A single stage secondary oxygen concentrator for receiving a gas mixture from a first stage oxygen concentrator, comprising:
   a first carbon molecular sieve bed having an inlet, a product outlet, and a discharge outlet;
   a second carbon molecular sieve bed having an inlet, a product outlet, and a discharge outlet;
   a single first inlet valve connected to said inlet of said first carbon molecular sieve bed and having an open position and a closed position;
   a single second inlet valve connected to said inlet of said second carbon molecular sieve bed having an open position and a closed position;
   a first product outlet valve connected to said product outlet of said first carbon molecular sieve bed;
   a second product outlet valve connected to said product outlet of said second carbon molecular sieve bed;
   said oxygen concentrator having control means for controlling a first cycle in which said first carbon molecular sieve bed is being charged with the gas mixture through said single first inlet valve and said second carbon molecular sieve bed is being desorbed;
   wherein during said first cycle said single first inlet valve is in said open position allowing the said gas mixture to flow into said first carbon molecular sieve bed, said first product outlet valve is in said closed position as the gas mixture flows through said first carbon molecular sieve bed and oxygen is selectively adsorbed from the gas mixture and said single second inlet valve is in said closed position and said second product outlet valve is open allowing a first high purity oxygen product to flow from said second carbon molecular sieve bed.

12. The concentrator of claim 11, wherein said oxygen concentrator has a second cycle controlled by said control means in which said second carbon molecular sieve bed is being charged with the gas mixture through the single second inlet valve and said first carbon molecular sieve bed is being desorbed;
   wherein during said second cycle said single second inlet valve is in said open position allowing the gas mixture to flow into said second carbon molecular sieve bed and said second product outlet valve is in said closed position as the gas mixture flows through said second carbon molecular sieve bed and oxygen is selectively adsorbed from the gas mixture and said single first inlet valve is in said closed position and said first product outlet valve is open allowing a second high purity oxygen product to flow from said first carbon molecular sieve bed.

13. The concentrator of claim 12, wherein the second high purity oxygen product has a concentration in excess of approximately 99% and an argon concentration of less than approximately 1%.

14. The concentrator of claim 12, further comprising a relief valve connected to said first product valve and to said second product valve.

15. The concentrator of claim 14, wherein said control means switches to said second cycle following completion of said first cycle so that the first product outlet valve moves from said closed position to said open position and a first surge of gas is vented by the relief valve, and said control means switches to the first a cycle following completion of said second cycle the second product outlet valve moves from said closed position to said open position and a second surge of gas is vented by the relief valve.

16. The concentrator of claim 12, further comprising a pump in communication with said first product valve and said second product valve.

17. The concentrator of claim 11, further comprising an adjustable orifice in communication with said discharge outlet of said first carbon molecular sieve bed and to said discharge outlet of said second carbon molecular sieve bed.

18. The concentrator of claim 17, further comprising a first check valve connected to said discharge outlet of said first carbon molecular sieve bed and a second check valve connected to said discharge outlet of said second carbon molecular sieve bed.

19. The concentrator of claim 17, wherein the concentrator further comprises:
   a first check valve connected to said discharge outlet of said first carbon molecular sieve bed and said adjustable orifice; and
   a second check valve connected to said discharge outlet of said second carbon molecular sieve bed and said adjustable orifice.

20. The concentrator of claim 11, wherein said gas mixture is received from a single source.

21. The concentrator of claim 11, wherein the first stage oxygen concentrator has at least one zeolite molecular sieve bed.

22. The concentrator of claim 11, wherein the gas mixture has an oxygen concentration of approximately 95% and an argon concentration of approximately 5% and the first high purity oxygen product has a concentration in excess of approximately 99% and an argon concentration of less than approximately 1%.

* * * * *